United States Patent [19]
Cho

[11] Patent Number: 4,934,399
[45] Date of Patent: Jun. 19, 1990

[54] PIPELINE PRESSURE CONTROL SYSTEM

[75] Inventor: Chun H. Cho, Marshalltown, Iowa

[73] Assignee: Fisher Controls International, Inc., Clayton, Mich.

[21] Appl. No.: 343,152

[22] Filed: Apr. 25, 1989

[51] Int. Cl.⁵ ............................................ G05D 16/00
[52] U.S. Cl. ................................... 137/14; 137/487.5
[58] Field of Search ................... 137/14, 1, 487.5, 486

[56] References Cited

U.S. PATENT DOCUMENTS

| | | | |
|---|---|---|---|
| 2,116,550 | 5/1938 | Adelson | 73/194 |
| 2,399,938 | 5/1946 | Pett | 137/152.5 |
| 2,606,445 | 8/1952 | Eckman | 73/207 |
| 2,609,831 | 9/1952 | Macgeorge | 137/487 |
| 2,858,700 | 11/1958 | Rose | 73/407 |
| 2,956,576 | 10/1960 | McKeggie | 137/100 |
| 3,126,739 | 3/1964 | Whitehill | 73/205 |
| 3,713,337 | 1/1973 | Stroman | 73/205 R |
| 4,244,231 | 1/1981 | Teterevyatnikov | 73/861.42 |
| 4,724,865 | 2/1988 | Hirano | 137/487.5 X |

OTHER PUBLICATIONS

Sama Standard PMC 22.1-1981; "Functional Diagramming of Instrument and Control Systems," Sep. 1981, pp. 1-28.
W. J. Williams, et al., "Pipeline Microprocessor Control", InTech, Feb. 1988, pp. 49-53.
Chun H. Cho, et al., "Modern Control Systems for Liquid Pipelines", Reprinted from Pipeline & Gas Journal, Jul. 1977.
H. A. Brainerd, "Good Surge Control Can Help Pipeline Throughput", Technology, Aug. 30, 1982, Oil & Gas Journal, pp. 126, 129-133, 137.
Craig A. Sydney & Chun H. Cho, "Advances in Microprocessor Based Controllers", Advances in Instrumentation vol. 35, Part 2, Proceedings of the ISA Conference and Exhibit, 1980, pp. 205-211.

*Primary Examiner*—Alan Cohan
*Attorney, Agent, or Firm*—Marshall, O'Toole, Gerstein, Murray & Bicknell

[57] ABSTRACT

A pipeline pressure control system for minimizing pressure surges within a pipeline includes a suction pressure controller connected to a suction pressure transmitter for sensing the pipeline pressure upstream of a valve and a discharge pressure controller connected to a discharge pressure transmitter for sensing the pipeline pressure downstream of the valve. If either the suction pressure controller or the discharge pressure controller senses a pressure that varies more than a predetermined amount from a predetermined target pressure, the valve will automatically be moved to a predetermined position in order to counteract pressure surges.

28 Claims, 3 Drawing Sheets

PIPELINE PRESSURE CONTROL SYSTEM

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to an apparatus and method for controlling pressure surges in pipelines, and more particularly to an apparatus and method for controlling pipeline pressure surges by responding to pressure surges to limit its overshoot or undershoot to less than 10 psi (7 $N/cm^2$) for a surge magnitude of 40 psi/sec (28 $N/cm^2/sec$).

Pipelines for transporting crude oil from wells to refineries and refined products from refineries to distribution points require pumping stations to be connected at various points along the pipeline. Since pipeline pressure gradually decreases with distance along the pipeline due to friction of the internal walls of the pipeline, pumping stations must be used to periodically boost the pipeline pressure so that a designed flow rate through the pipeline is maintained.

Pressure surges are created within the pipeline as pumps in the pumping stations are turned on and off and as valves are opened and closed. The shut down of a pump station causes a positive pressure surge of increased pressure that travels within the pipeline in the opposite direction of liquid flow, or upstream, and a negative pressure surge of decreased pressure that travels in the direction of flow, or downstream. As noted by H. A. Brainerd in "Good Surge Control Can Help Pipeline Throughput," pressure surges travel through the liquid in a pipeline at sonic velocity, which typically varies from 3,000–4,000 feet per second, depending upon the nature of the liquid and the physical characteristics of the pipeline. The magnitude of such a pressure surge may be as small as one pound per square inch (psi) per second (0.7 Newtons per square centimeter ($N/cm^2$) per second) or greater than 2,000 psi per second (1380 $N/cm^2$ per second). The magnitude and velocity of a pressure surge decrease as the surge travels through the pipeline, in part due to the stretch of the pipeline and the compressibility of the liquid.

Since a significant portion of the cost of a pipeline system is the piping itself, it is economically advantageous to use pipes having the thinnest walls as possible. However, the incentive to use thin-walled pipes must be balanced with the possibility that the pipeline might burst due to an uncontrolled positive pressure surge, thus causing a significant economic burden due to product loss and environmental damage. Since pipelines are generally operated at 75% to 90% of the pipe yield strength, with 500 to 2,000 psi (345 to 1380 $N/cm^2$) being the range of typical operating pressures, a pipeline rupture could be caused by an overpressure on the order of a mere 50 psi (35 $N/cm^2$).

In addition to the pipeline rupture problem caused by positive pressure surges, negative pressure surges are undesirable because they may damage the pump motors due to cavitation. Cavitation, which is a well known problem, may occur when the upstream pipeline pressure falls below the vapor pressure of the fluid. Cavitation may cause damage to pump chamber walls, impellers, and other pumping station surfaces which come into contact with the fluid. Thus, it is desirable to control negative pressure surges upstream of the pumping station.

Typical pipeline systems include one or more controllers for controlling the pipeline pressure at each pumping station. Where multiple controllers are used, one controller is typically used to control the downstream, or discharge pressure, and a separate controller is used to control the upstream, or suction pressure. A third controller may be used to control the motor current of a motor used to drive the pump used in the pumping station.

The outputs of the controller or controllers are typically used to control a valve operatively connected to vary the pipeline flow on the downstream side of the pumping station. The pipeline pressure is controlled by opening or closing the valve. Opening the valve causes the suction pressure to be decreased and the discharge pressure to be increased, and closing the valve causes the suction pressure to be increased and the discharge pressure to be decreased. Because it reduces the amount of energy needed to maintain a predetermined flow, the valve is typically held wide open, and is only partially closed when either the suction pressure drops below a predetermined suction pressure setpoint or when the discharge pressure rises above a predetermined discharge setpoint.

A conventional pipeline system typically includes a high pressure sensing system which responds to any discharge pressure above a first, relatively high, predetermined shutdown pressure by shutting down the motor in the pumping station in order to prevent pipeline rupture. A low pressure sensing system is also provided to shut down the pipeline in case the suction pressure drops below a second, relatively low, predetermined shutdown pressure to prevent cavitation damage.

In a typical pipeline system, the discharge (pressure is controlled with respect to a discharge pressure setpoint, which is typically 50–100 psi (35–70 $N/cm^2$) below the discharge shutdown pressure. The magnitude of the pressure difference between the discharge setpoint and discharge shutdown pressure is a measure of the effectiveness of the pressure control system. It is desirable to keep this pressure difference at a minimum. Since the discharge shutdown pressure depends upon the yield strength of the pipeline, the shutdown pressure is relatively fixed. If the discharge pressure setpoint can be made higher, or closer to the discharge shutdown pressure, the flow through the pipeline will increase. Thus, as the pressure difference between the discharge pressure setpoint and the discharge shutdown pressure is minimized, the flow through the pipeline is maximized, thus achieving the maximal economic benefit.

An ideal pipeline pressure control system would be able to control the actual discharge pressure to within 1 psi, for example, of the discharge pressure setpoint, so that the setpoint could be set just below the shutdown pressure to maximize flow. However, pipeline pressure control systems are not ideal and, as indicated above, the discharge pressure setpoint is typically set 50–100 psi (35–70 $N/cm^2$) below the shutdown pressure.

Prior pipeline pressure control systems have inherent disadvantages which limit their effectiveness in quickly responding to pressure surges. For example, conventional pressure control systems typically use proportional/integral/derivative (PID) control modes. PID control is a well known, conventional type of control in which the actual pipeline pressure is repeatedly sampled in a digital system and compared to a predetermined pressure setpoint. After each comparison, the position of the valve is adjusted based upon the sign and magnitude of the pressure difference. Variations of PID control are also used, such as proportional-only control and proportional and integral (PI) control. Conventional PID controllers have the capability to perform all three types of control: proportional-only control, PI control, and PID control.

During a pressure surge, the use of PI or PID control by a conventional PID controller may require many pressure samples and valve position adjustments before the position of the valve is satisfactorily modified. As a result, the actual pipeline pressure may often vary a large amount from the pressure setpoint, in which case the discharge pressure setpoint would have to be set undesirably large amount below the discharge shutdown pressure to avoid repeated shutdown of the system, resulting in reduced flow through the pipeline.

SUMMARY OF THE INVENTION

These and other disadvantages are overcome by the present invention, which is directed to a pressure control system which quickly reacts to minimize any adverse effects of pressure surges within the pipeline.

In one aspect of the invention, a pressure control system engages in both PI control and surge control. Surge control is initiated to counteract the effects of negative pipeline pressure surges which might result in cavitation damage and positive pressure surges which might result in pipeline rupture or shutdown. In a preferred embodiment, surge control is initiated when the pipeline suction pressure drops more than a predetermined amount below the pipeline suction pressure setpoint and when the pipeline discharge pressure rises more than a predetermined amount above the pipeline discharge pressure setpoint. As a result of the surge control of the invention, the pipeline valve is quickly closed from its initial position to a predetermined position in a single movement, and this causes the undesirable effects of the pressure surge to be counteracted. Because the valve is moved from its initial position to a predetermined position which may be significantly different from the initial position in a single, quick valve movement, the effects of large pressure surges may be counteracted much faster than by conventional pressure control systems, which repeatedly move the valve in small increments in an attempt to counteract a pressure surge.

In another aspect, the invention is directed to a method of controlling pressure surges which includes the steps of sensing the pressure within a conduit, computing the actual difference between the sensed pressure and a predetermined pressure, and comparing the actual pressure difference so computed with a predetermined pressure difference. If the actual pressure difference is greater than the predetermined pressure difference, the valve is moved from its initial position to a predetermined position. This aspect of the invention also results in improved control of the conduit pressure.

The most effective predetermined pressure difference which triggers the surge control of the invention has been found to be approximately five psi (3.5 N/cm$^2$). At pressure differences significantly less than this, a pressure control system would be too sensitive, and thus would have a tendency to detect false pressure surges and engage in surge control in circumstances where it would not be necessary. At pressure differences significantly larger than approximately five psi (3.5 N/cm$^2$), the surge control would be delayed an undesirable amount of time. Subject to these considerations, the predetermined pressure difference may be adjusted to values other than five psi.

During testing, the invention has been found to be dramatically effective in counteracting the effects of pipeline pressure surges. In addition, the efficiency of a pipeline pressure control system in accordance with the invention allows the use of a relatively high discharge pressure setpoint, being within approximately 20 psi (14 N/cm$^2$) of the discharge shutdown pressure, which allows for increased pipeline throughput.

These and other objects, features, and advantages of the present invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figure 1:
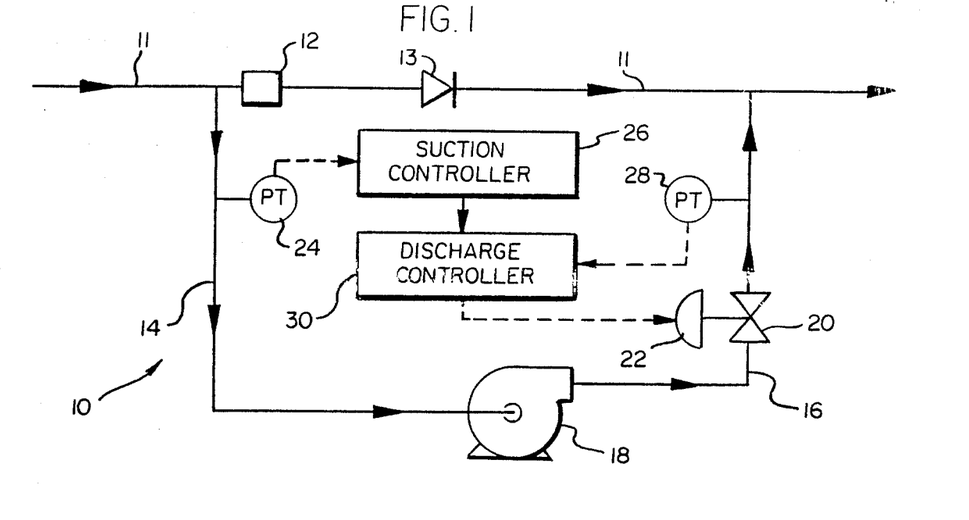
FIG. 1 is a diagram of a preferred embodiment of a pipeline system.

Referring to FIG. 1, a pumping station 10 is shown connected to a pipeline 11 for transporting oil or refined products. The liquid flows through the pipeline in the direction indicated by the arrows. The pipeline 11 includes a normally closed valve 12 and a one-way check valve 13. The pumping station 10 receives liquid flow at a relatively low pressure via an input pipeline 14 and boosts the pressure by supplying high pressure liquid via an output pipeline 16 in order to maintain an acceptable rate of flow through the pipeline. The pumping station 10 includes a pump 18 driven by a motor (not shown) and a valve 20 controlled by a valve actuator 22 for regulating flow through the output pipeline 16.

During the normal operation of the pumping station 10, the valve 12 is closed, and the liquid being pumped flows through the input pipeline 14, the pump 18, the output pipeline 16, and the valve 20. However, if the pump 18 is not in operation, the valve 12 opens, allowing the liquid to flow through the pipeline 11 and check valve 13 so that it bypasses the pump 18.

An electronic control system controls the operation of the valve 20 to provide precise control of the pipeline pressure so that the suction pressure, which is the pressure upstream of the pumping station 10, is maintained at an acceptably high pressure to prevent cavitation or pipeline shutdown and the discharge pressure, which is the pressure downstream of the pumping station 10, is maintained at a sufficiently low pressure to prevent rupture of the pipeline or pipeline shutdown.

The control system includes a suction pressure transmitter 24 connected to the input pipeline 14 to sense the liquid pressure within the input pipeline 14 and generate an analog signal proportional to the sensed suction pressure. The analog signal thus generated is transmitted to a suction controller 26 which contributes to the control of the valve 20. A discharge pressure transmitter or sensor 28 is connected to the output pipeline 16 to sense the discharge pressure in a like manner and transmit an analog signal proportional to the discharge pressure to a discharge controller 30, which also contributes to the control of the valve 20. The terms "pressure transmitter," "pressure transducer," and "pressure sensor" are used interchangeably herein.

Figure 3:
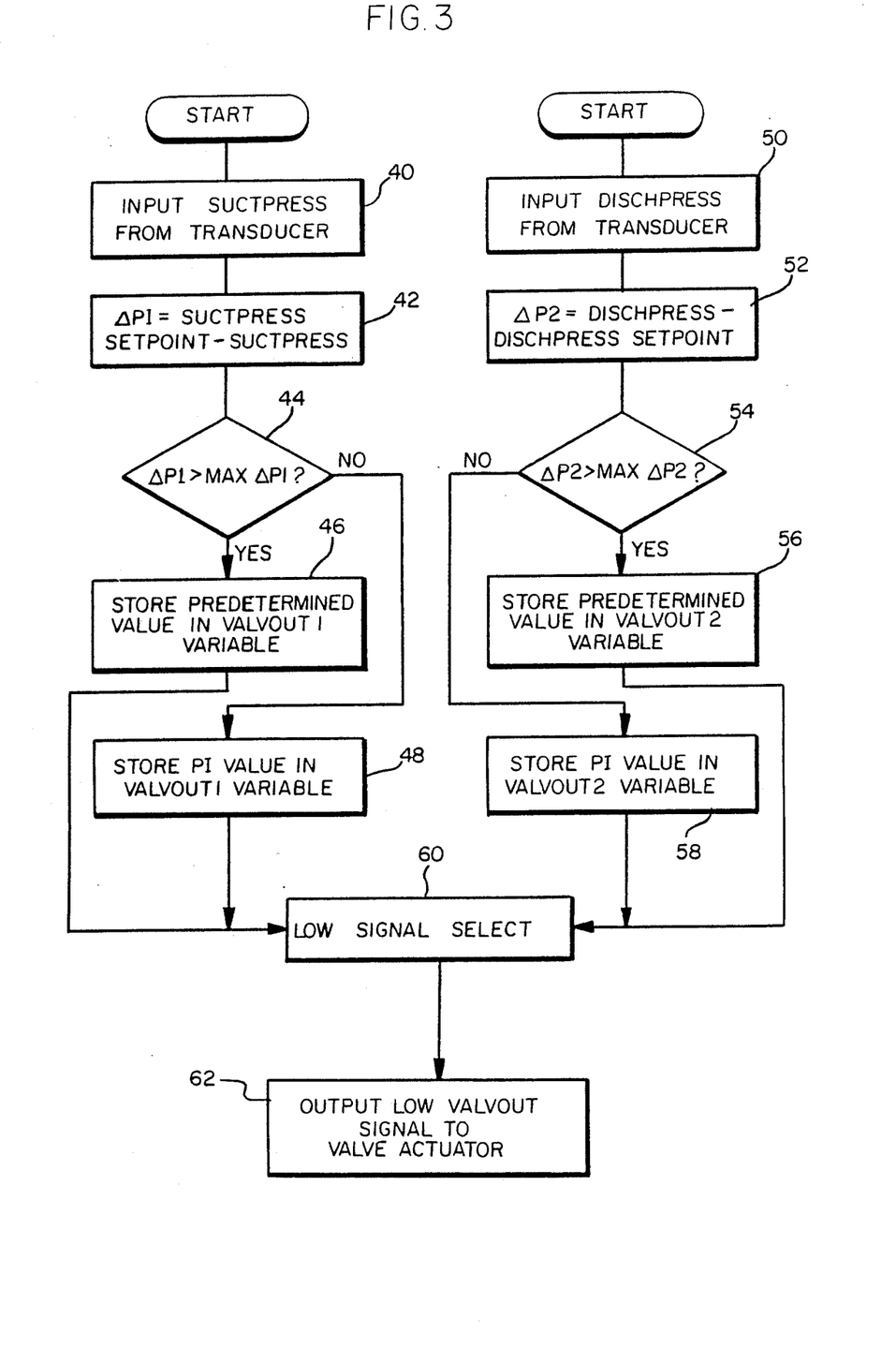
FIG. 3 is a flowchart of a computer program which controls the operation of the suction and discharge controllers of FIG. 1.

Each of the controllers 26, 30 may be a conventional process controller such as a CL6211 or CL6242 controller commercially available from Fisher Controls, Inc. of Marshalltown, Iowa. Such a controller has analog inputs that may be directly connected to the pressure transmitters and analog outputs that may be connected directly to the valve actuator 22. The operation of each controller is controlled by a relatively simple computer program referred to as a function sequence table. The function sequence table for each of the controllers 26, 30 is included below as part of this specification, and a flowchart of the function sequence tables is shown in FIG. 3 and described in connection therewith.

The valve actuator 22 is controlled by means of an analog current that is transmitted by the discharge controller 30. This analog current may range from four milliamps, which corresponds to a fully closed valve position, to 20 milliamps, which corresponds to a fully open valve 20 position. The output current signal is linear; thus, for each percentage change in the actuator signal, the valve 20 is moved a predetermined amount. In the preferred embodiment, the valve actuator 22 is a fast-stroking Type 320 Electro-hydraulic Actuator commercially available from Fisher Controls, Inc., and is capable of stroking its full range in less than three seconds.

During operation of the system, both the suction controller 26 and the discharge controller 30 determine a respective output signal that is to be sent to control the operation of the valve actuator 22. Although each controller determines an output signal, only the numerically lower of the two signals is selected to drive the valve actuator 22, which is accomplished by making the discharge controller 30 reverse acting. Selecting the lower of the two signals is important because the valve 20 must be moved to the more closed valve position as determined by either controller, since a more closed valve position causes the suction pressure to increase and the discharge pressure to decrease, which is desirable to minimize the cavitation and pipeline rupture problems described above.

For example, suppose that the valve 20 were completely open, that the suction controller 26 sensed an suction pressure acceptably above the low suction setpoint, and that the discharge controller 30 sensed a discharge pressure a predetermined amount above the discharge pressure setpoint. In this case, the suction controller 26 would not change the valve position, and thus would generate a high output signal corresponding to the completely open position. However, the discharge controller 30 would generate a lower output signal that would correspond to a predetermined partially closed valve position so that the high discharge pressure would be reduced. In this case, the lower signal would be sent so that the valve 20 would be partially closed so that the undesirable high discharge pressure would be reduced.

The control system may also include a third controller (not shown) connected to the pump motor (not shown) for the purpose of protecting the motor against overload. If such a third controller is desired, it would be connected to the discharge controller 30 and would generate a valve output signal that would be compared to the two valve output signals generated by the other controllers 26, 30. The lowest of the three valve output signals, corresponding to the most-closed valve position, would then be sent to the valve actuator 22 to control the position of the valve 20. The use of such a motor controller is conventional and, while it could be used with the present invention, is not considered to form an integral part of the present invention.

Overview of Operation

In operation, the controllers 26, 30 operate substantially simultaneously, each executing a similar sequence of steps. The suction controller 26 engages in a sequence of steps which includes: (1) sensing the pipeline pressure upstream of the valve 20 by means of the pressure transmitter 24; (2) determining the pressure difference between the sensed pressure and a predetermined suction pressure setpoint; and (3) comparing the pressure difference so determined with a predetermined pressure difference. The discharge controller 30 executes a similar sequence of steps which includes: (1) sensing the pipeline pressure downstream of the valve 20 by means of the pressure transmitter 28; (2) determining the pressure difference between the sensed pressure and a predetermined discharge pressure setpoint; and (3) comparing the pressure difference so determined with a second predetermined pressure difference.

The two controllers 26, 30 engage in either PI control or surge control. Surge control is used when the sensed pressure, either suction pressure or discharge pressure, varies more than a predetermined amount from the corresponding setpoint. PI control is used when the sensed pressure is beyond the corresponding pressure setpoint, but less than the predetermined amount from the corresponding setpoint.

Figure 2A:
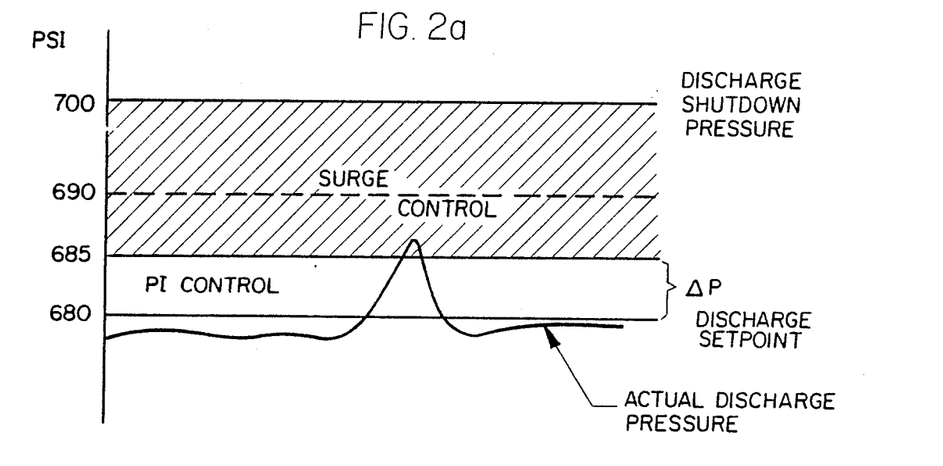
FIG. 2a is a graph showing an exemplary relationship of the discharge pressure to the discharge pressure setpoint and the discharge shutdown pressure in a pressure control system in accordance with the invention.

Now referring to FIG. 2a, an exemplary pressure control system in accordance with the invention is shown to have a discharge shutdown pressure of 700 psi (483 N/cm$^2$) and a discharge pressure setpoint of 680 psi (469 N/cm$^2$). The actual discharge pressure is shown to vary, and a horizontal line at 685 psi (473 N/cm$^2$) corresponds to a predetermined pressure difference of five psi (3.5 N/cm$^2$) above the discharge pressure setpoint. During operation of the pressure control system, the actual pressure may enter the area shown in FIG. 2a between 680 psi (469 N/cm$^2$) and 685 psi (473 N/cm$^2$). In this case, the control system will engage in PI control to reduce the discharge pressure. As a result, the valve 20 is moved from its initial position to a new position, depending upon the magnitude of the pressure difference between the actual sensed pressure and the discharge pressure setpoint.

However, in the event of a more pronounced pressure surge, the actual discharge pressure may rise above 685 psi (473 N/cm$^2$), in which case the system will engage in surge control. As a result of surge control, the system causes the valve 20 to be moved from its initial position to a predetermined, more closed position to quickly reduce the discharge pressure. Thus, the system engages in either PI control or surge control, PI control being undertaken when the discharge pressure is between 680 psi (469 N/cm$^2$) and 685 psi (473 N/cm$^2$) and surge control being undertaken when the discharge pressure is between 685 psi (473 N/cm$^2$) and 700 psi (483 N/cm$^2$) as shown by the cross-hatched area in FIG. 2a. It has been determined that a system in accordance with the present invention can control positive pressure surges so that the actual discharge pressure does not increase more than 10 psi (7 N/cm$^2$) above the discharge pressure setpoint, as indicated by the dotted line at 690 psi (476 N/cm$^2$) in FIG. 2a.

Figure 2B:
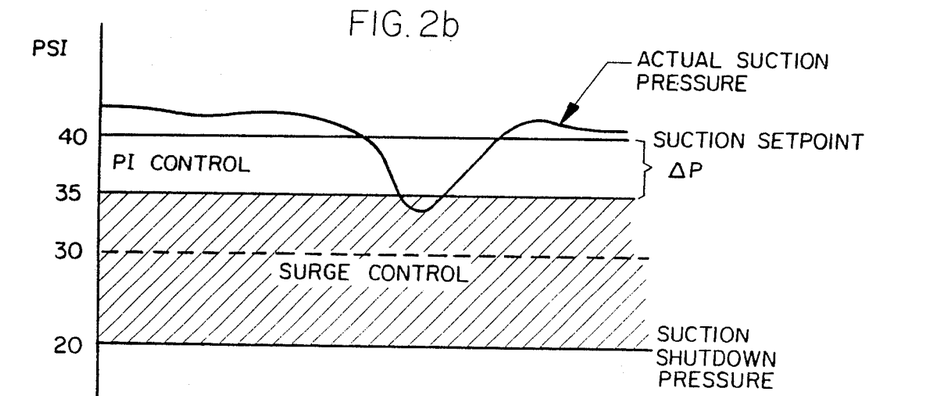
FIG. 2b is a graph showing an exemplary relationship of the suction pressure to the suction pressure setpoint and the suction shutdown pressure in a pressure control system in accordance with the invention.

Now referring to FIG. 2b, an exemplary pressure control system in accordance with the invention is shown to have a suction shutdown pressure of 20 psi (14 N/cm$^2$) and a suction pressure setpoint of 40 psi (28 N/cm$^2$). The actual suction pressure is shown to vary, and a horizontal line at 35 psi (24 N/cm$^2$) corresponds to a predetermined pressure difference of five psi (3.5 N/cm$^2$) below the suction pressure setpoint. During operation of the pressure control system, the actual pressure may enter the area shown in FIG. 2b between 35 psi (24 N/cm$^2$) and 40 psi (28 N/cm$^2$). In this case, the control system will engage in PI control to increase the suction pressure. As a result, the valve 20 is moved from its initial position to a new, more closed position, depending upon the magnitude of the pressure difference between the actual sensed pressure and the suction pressure setpoint.

If the suction pressure were to drop below 35 psi (24 N/cm$^2$), the system would engage in surge control. As a result, the valve 20 would be moved from its initial position to a predetermined, more closed position to quickly increase the suction pressure. Thus, the system engages in either PI control or surge control, PI control being undertaken when the suction pressure is between 35 psi (24 N/cm$^2$) and 40 psi (28 N/cm$^2$) and surge control being undertaken when the suction pressure is between 20 psi (14 N/cm$^2$) and 35 psi (24 N/cm$^2$) as shown by the cross-hatched area in FIG. 2b. It has been determined that a system in accordance with the invention can control negative pressure surges so that the actual suction pressure does not decrease more than 10 psi (7 N/cm$^2$) below the section pressure setpoint, as indicated by the dotted line shown at 30 psi (31 N/cm$^2$) in FIG. 2b.

The pressures shown in FIGS. 2a and 2b are intended to be exemplary only and are shown for purposes of explanation. In a typical system, the suction pressure setpoint is normally within the range of 20-100 psi (14-70 N/cm$^2$), while the discharge pressure setpoint is normally set within the range of 500-2,000 psi (345-1380 N/cm$^2$). A higher discharge pressure setpoint will usually correspond to a smaller diameter pipeline or conduit, while larger diameter pipelines tend to have lower discharge pressure setpoints. The actual discharge and suction pressures shown in FIGS. 2a and 2b are not intended to identically correspond to what these pressures would look like in an actual, operating system.

The discharge and suction pressure setpoints are selected so that during normal operation, the valve 20 is completely open. As a result, normal PI control will cause the valve 20 to be partially closed only when the discharge pressure rises above the discharge pressure setpoint or when the suction pressure drops below the suction pressure setpoint.

As indicated above, the most effective predetermined pressure difference which triggers the surge control of the invention has been found to be approximately five psi (3.5 N/cm$^2$). At pressure differences less than this, the pressure control system is too sensitive, and thus has a tendency to detect false pressure surges and engage in surge control in circumstances where it is not necessary. At pressure differences significantly larger than approximately five psi (3.5 N/cm$^2$), the surge control is delayed an undesirable amount of time, thus causing an undesirable large overshoot or undershoot pressure. However, subject to the foregoing considerations, predetermined pressure differences other than five psi could be used, depending on the design of the system. In addition, the predetermined pressure difference for the discharge controller 30 could be different than the predetermined pressure difference for the suction controller 26.

Detailed Operation

During operation, each of the controllers 26, 30 continuously monitors its respective pressure by means of the pressure transmitters 24, 28. Each controller may engage in either PI control or surge control. As explained above, surge control is used when the sensed pressure varies more than a predetermined amount from the respective pressure setpoint, and PI control is used when the sensed pressure is within the predetermined amount of the respective pressure setpoint. Each controller generates a valve control signal either by surge control or conventional PI control. The numerically lower valve control signal is then used to control the valve 20.

The operation of each controller 26, 30 is controlled by a computer program known as a function sequence table executed by the controller. The two function sequence tables are set forth below and form a part of this specification. A flowchart of the function sequence tables is set forth in FIG. 3, and the operation of the preferred embodiment of the invention is made in connection therewith.

Now referring to FIG. 3, the suction controller 26 executes steps 40-48 twenty times per second to rapidly track and control any changes in the suction pressure in the pipeline. At step 40, the suction controller 26 reads the suction pressure from the suction pressure transducer 24 and stores the numeric value in the variable SUCTPRESS. As described above, in order to prevent cavitation and the resultant damage it causes to the pumping station components, the suction pressure must be kept above a certain pressure. To this end, steps 42-44 of the program determine whether the suction pressure has dropped a predetermined amount below the suction pressure setpoint. If the pressure has dropped that low, the suction controller 26 causes the valve actuator 22 to be moved to a predetermined valve position, which will result in partial closure of the valve 20 in a quick, single movement so that the suction pressure will be quickly increased.

Specifically, at step 42 the suction pressure just read from the transducer 24, SUCTPRESS, is subtracted from the suction pressure setpoint. This difference is stored in the variable ΔP1. Then at step 44, the numeric value of ΔP1 is compared to the variable MAX ΔP1, which contains a numeric value corresponding to a predetermined amount of pressure below the suction pressure setpoint. MAX ΔP1 is preferably about 5 psi (3.5 N/cm$^2$). If the suction pressure falls more than this predetermined amount below the suction pressure setpoint, then surge control will be initiated, and the valve 20 will be moved to a predetermined position as a result.

Step 44 is a branch step that determines whether or not surge control will be utilized. If ΔP1 is greater than MAX ΔP1, indicating the need for surge control, then the program branches to step 46, at which point the program stores a predetermined value in the VALVOUT1 variable. This predetermined valve stored in the VALVOUT1 variable corresponds to the electric current value that will cause the valve 20 to be moved to the desired predetermined position.

If ΔP1 is not greater than MAX ΔP1, then there is no need for surge control, and the program causes PI control to be performed based on the suction pressure SUCTPRESS and stores a valve signal value based thereon in the VALVOUT1 variable.

While the suction controller 26 is performing steps 40–48, the discharge controller executes steps 50–58 twenty times per second to rapidly track and control any changes in the discharge pressure in the pipeline. At step 50, the discharge controller 30 reads the discharge pressure from the discharge pressure transmitter 28 and stores the numeric value in the variable DISCHPRESS.

As described above, in order to prevent the pipeline from having to be shut down as a result of a dangerously high pressure surge, the discharge pressure must be kept below a certain pressure. To this end, steps 52–54 determine whether the discharge pressure has risen more than a predetermined amount above the discharge pressure setpoint. If the pressure has risen that high, the discharge controller 30 causes the valve actuator 22 to be moved to a predetermined valve position, which will result in partial closure of the valve 20 in a quick, single movement so that the discharge pressure will be quickly decreased.

Specifically, at step 52 the discharge pressure setpoint is subtracted from the discharge pressure, DISCHPRESS, just read from the transducer 28. This difference is stored in the variable ΔP2. Then at step 54, the numeric value of ΔP2 is compared to the variable MAX ΔP2, which contains a numeric value corresponding to a predetermined amount of pressure above the discharge pressure setpoint. MAX ΔP2 is preferably about 5 psi (3.5 N/cm$^2$). If the discharge pressure rises more than this predetermined amount above the discharge pressure setpoint, then surge control will be initiated, and the valve 20 will be moved to a predetermined position as a result.

Step 54 is a branch step that determines whether or not the surge control of the invention will be utilized. If ΔP2 is greater than MAX ΔP2, indicating the need for surge control, then the program branches to step 56, at which point the program stores a predetermined value in the VALVOUT2 variable. This predetermined value stored in the VALVOUT2 variable corresponds to the electric current value that will cause the valve 20 to be moved to the desired predetermined position. This predetermined value stored in step 56 executed by the discharge controller 30 does not have to be the same as the predetermined value stored in step 46 executed by the suction controller 26.

If ΔP2 is not greater than MAX ΔP2, then there is no need for surge control, and PI control is performed on the discharge pressure DISCHPRESS, and a valve signal value based upon the PI control is stored in the VALVOUT2 variable.

At step 60, the program compares the values of the two valve control signals, VALVOUT1 and VALVOUT2, generated by the respective controllers. The signal having the lower numeric value, which corresponds to the more closed valve position, is used to control the valve 20 by means of the valve actuator 22. As described above, this is important because the valve 20 must be moved to the more closed valve position as determined by either controller, since a more closed valve position causes the suction pressure to increase and the discharge pressure to decrease, which is desirable to minimize the cavitation and pipeline rupture problems described above.

At step 62, the lower of the two signals, VALVOUT1 or VALVOUT2, is sent to the valve actuator 22 to control the valve 20.

Figure 4:
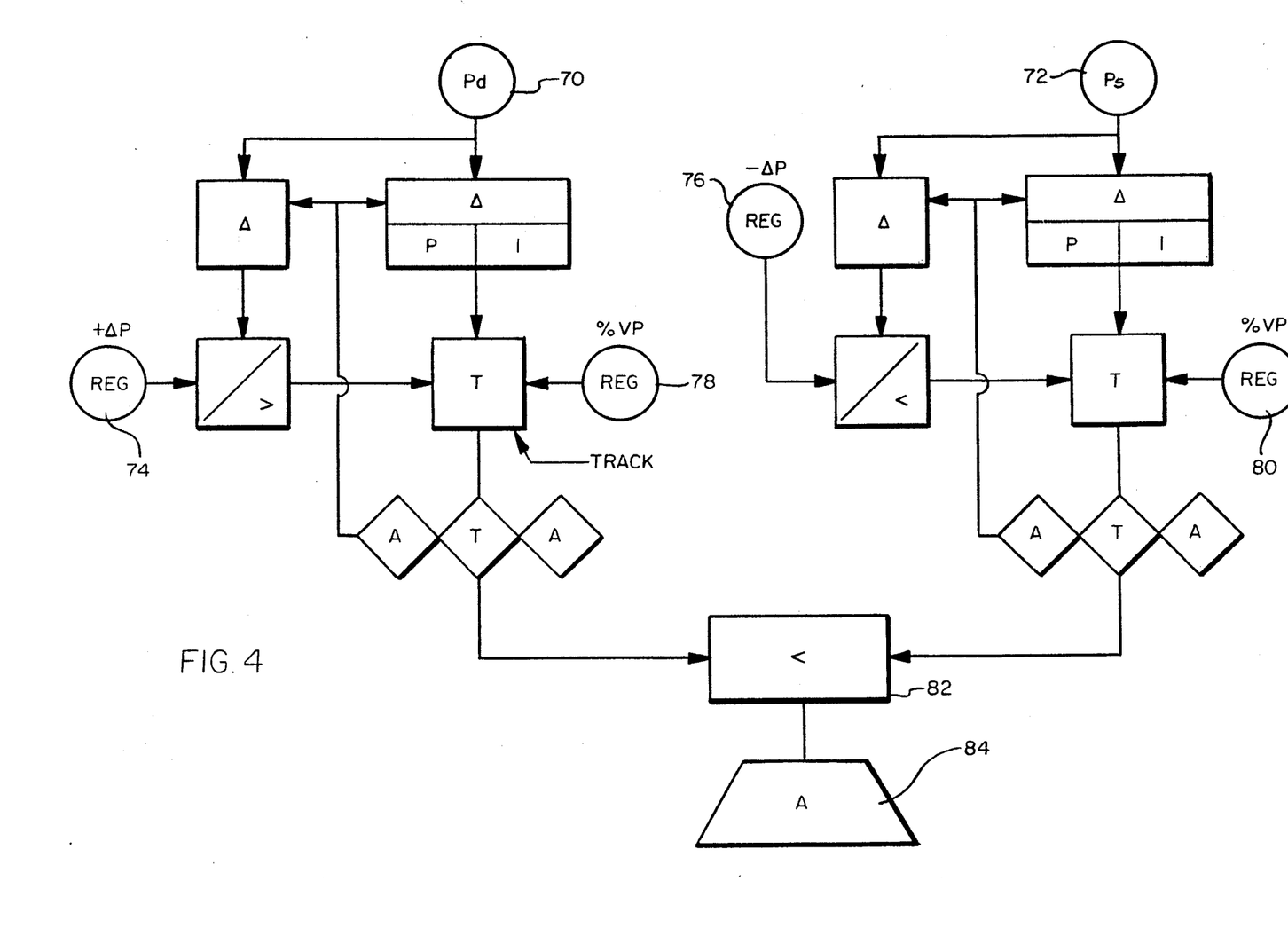
FIG. 4 is a representation of the method of control in accordance with the present invention.

A functional diagram of the method of control in accordance with the invention is shown in FIG. 4. The functional diagram is made in accordance with the Scientific Apparatus Makers Association (SAMA) Standard PMC 22.1-1981, which standard is described in the publication entitled "SAMA—Functional Diagramming of Instrument and Control Systems" dated September 1981, which standard and publication are incorporated herein by reference. This functional diagram is provided in this specification only for those who have a working knowledge of such diagrams, and only a general description of FIG. 4 is provided below. Accordingly, in the event there is any perceived discrepancy between the above description of the invention and the general description of the diagram of FIG. 4 set forth below, the above description of the invention shall control.

Now referring to FIG. 4, a circle 70 containing the letters Pd represents the measurement of the discharge pressure, and a circle 72 containing the letters Ps represents the measurement of the suction pressure. The circle 74 represents a register in the discharge controller 30 in which a predetermined pressure difference is stored, and the circle 76 represents a register in the suction controller 26 in which a predetermined pressure difference is stored. The circle 78 represents a register in the discharge controller 30 in which a predetermined valve position is stored, and the circle 80 represents a register in the suction controller 26 in which a predetermined valve position is stored. The block 82 represents a low signal select step, and the trapezoid 84 represents the valve actuator 22.

The invention described herein may have application in other technical areas besides pipeline systems. For example, it might be used in compressor surge protection systems having recirculation valves. While PI control is used in the preferred embodiment, the invention is not limited to that type of control.

Modifications and alternative embodiments of the invention will be apparent to those skilled in the art in view of the foregoing description. Accordingly, this description is to be construed as illustrative only, and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A pressure control system that responds to pressure surges in a pipeline by changing the pipeline pressure in the direction opposite the pressure surge, said pressure control system comprising:
   a pipeline;
   a valve coupled to said pipeline for varying the flow of fluid through said pipeline;
   a suction pressure sensor coupled to said pipeline upstream of said valve for sensing the suction pressure of the fluid within said pipeline;
   a discharge pressure sensor coupled to said pipeline downstream of said valve for sensing the discharge pressure of the fluid within said pipeline;
   a suction controller coupled to said suction pressure sensor, said suction controller comparing the suction pressure sensed by said suction pressure sensor with a first predetermined pressure setpoint to determine when the suction pressure is lower than said first pressure setpoint by more than a first predetermined amount of at least approximately five psi; and
   a discharge controller coupled to said discharge pressure sensor, said discharge controller comparing the discharge pressure sensed by said discharge pressure sensor with a second predetermined pressure setpoint to determine when the discharge pressure exceeds said second pressure setpoint by more than a second predetermined amount of at least approximately five psi,
   said valve being moved to a predetermined position in response to either said suction controller determining that the suction pressure is lower than said first pressure setpoint by more than said first predetermined amount or said discharge controller determining that the discharge pressure exceeds said second pressure setpoint by more than said second predetermined amount.

2. A pressure control system as defined in claim 1 wherein said discharge controller causes said valve to be moved to said predetermined position.

3. A pressure control system as defined in claim 1 wherein said first predetermined pressure setpoint is in the approximate range of 20–100 psi and said second predetermined pressure setpoint is in the approximate range of 500–2,000 psi.

4. A pressure control system as defined in claim 3 wherein said first predetermined amount is approximately equal to said second predetermined amount.

5. A pressure control system as defined in claim 4 wherein said first and said second predetermined amounts are approximately five psi.

6. A pipeline pressure control system that responds to a pressure surge in a pipeline by changing the pipeline pressure in the direction opposite the pressure surge, said pressure control system comprising:
   a pipeline;
   a valve coupled to said pipeline for varying the flow of fluid through said pipeline;
   a pressure sensor coupled to said pipeline for sensing the pressure of the fluid within said pipeline; and
   a controller coupled to said pressure sensor and said valve for controlling said valve, said controller causing said valve to be moved from an initial position to a predetermined position in response to said pressure sensor sensing a pressure that varies from a predetermined pressure setpoint by at least a predetermined amount, whereby the pipeline pressure is changed in the direction opposite the pressure surge.

7. A pipeline pressure control system as defined in claim 6 wherein said controller causes said valve to be moved to said predetermined position in response to said pressure sensor sensing a pressure that is greater than said predetermined amount above said predetermined pressure setpoint.

8. A pipeline pressure control system as defined in claim 6 wherein said initial value position is more open than said predetermined valve position.

9. A pressure control system as defined in claim 6 wherein said predetermined amount is approximately five psi.

10. A pressure control system that responds to a pressure surge in a conduit by changing the conduit pressure in the direction opposite the pressure surge, said pressure control system comprising:
    a conduit;
    a valve coupled to said conduit for varying the flow of fluid through said conduit;
    a pressure sensor coupled to said conduit for sensing the pressure of the fluid within said conduit; and
    a controller coupled to said pressure sensor and said valve for controlling said valve, said controller causing said valve to be moved to a predetermined position in response to said pressure sensor sensing a pressure that varies from a predetermined pressure by at least a predetermined amount, whereby the conduit pressure is changed in the direction opposite the pressure surge.

11. A pressure control system as defined in claim 10 wherein said predetermined amount is approximately five psi.

12. A pressure control system that responds to a pressure surge in a conduit by changing the conduit pressure in the direction opposite the pressure surge, said pressure control system comprising:
    a conduit;
    a valve coupled to said conduit for varying the flow of fluid through said conduit;
    a pressure sensor coupled to said conduit for sensing the pressure of the fluid within said conduit; and
    control means coupled to said valve and said pressure sensor for controlling the position of said valve, said control means causing said valve to be moved to a predetermined position in response to said pressure sensor sensing a pressure that varies from a predetermined pressure by at least a predetermined amount, whereby the conduit pressure is changed in the direction opposite the pressure surge.

13. A method of controlling a valve in which a pressure surge in a conduit is counteracted by changing the conduit pressure in the direction opposite the pressure surge, said method comprising the steps of:
    (a) sensing the pressure upstream of a valve within a conduit;
    (b) determining the difference between the pressure sensed in said step (a) and a first predetermined pressure;
    (c) comparing the pressure difference determined in said step (b) with a first predetermined pressure difference;
    (d) moving the valve to a first predetermined position if the pressure difference determined in said step (b) is greater than said first predetermined pressure difference;

(e) sensing the internal conduit pressure downstream of the valve;

(f) determining the difference between the pressure sensed in said step (e) and a second predetermined pressure;

(g) comparing the pressure difference determined in said step (f) with a second predetermined pressure difference; and (h) moving the valve to a second predetermined position if the pressure difference determined in said step (f) is greater than said second predetermined pressure difference.

14. A method as defined in claim 13 wherein said steps (a)-(c) are performed substantially simultaneously with and independently of said steps (e)-(g).

15. A method as defined in claim 13 wherein said first predetermined pressure difference is approximately five psi.

16. A method of controlling a valve in which a pressure surge in a conduit is counteracted by changing the conduit pressure in the direction opposite the pressure surge, said method comprising the steps of:

(a) sensing the pressure within a conduit;

(b) determining the difference between the pressure sensed in said step (a) and a predetermined pressure;

(c) comparing the pressure difference determined in said step (b) with a predetermined pressure difference; and (d) moving a valve to a predetermined position if the pressure difference determined in said step (b) is greater than said predetermined pressure difference, whereby the conduit pressure is changed in the direction opposite the pressure surge.

17. A method as defined in claim 16 wherein said predetermined pressure difference is approximately five psi.

18. A method of controlling a valve in which a pressure surge in a conduit is counteracted by changing the conduit pressure in the direction opposite the pressure surge, said method comprising the steps of:

(a) sensing the pressure within a conduit;

(b) determining the difference between the pressure sensed in said step (a) and a predetermined pressure;

(c) comparing the pressure difference determined in said step (b) with a predetermined pressure difference; and (d) if the pressure difference determined in said step (b) is greater than said predetermined pressure difference, moving a valve coupled to the conduit from an initial position to a predetermined position, whereby the conduit pressure is changed in the direction opposite the pressure surge; or (e) if the pressure difference determined in said step (b) is less than said predetermined pressure difference and the pressure sensed in said step (a) is beyond said predetermined pressure, moving the valve from an initial position to a new position based upon the pressure difference determined in said step (b).

19. A method as defined in claim 18 wherein said predetermined pressure difference is approximately five psi.

20. A method of controlling a valve in which a pressure surge in a conduit is counteracted by changing the conduit pressure in the direction opposite the pressure surge, said method comprising the steps of:

(a) sensing the pressure upstream of a valve within a conduit;

(b) determining the difference between the pressure sensed in said step (a) and a first predetermined pressure;

(c) comparing the pressure difference determined in said step (b) with a first predetermined pressure difference;

(d) if the pressure difference determined in said step (b) is greater than said first predetermined pressure difference, determining a new valve position based upon a first predetermined valve position; or (e) if the pressure difference determined in said step (b) is less than said first predetermined pressure difference and the pressure sensed in said step (a) is less than said first predetermined pressure, determining a new valve position based upon the difference determined in said step (b);

(f) sensing the pressure downstream of the valve within the conduit;

(g) determining the difference between the pressure sensed in said step (f) and a second predetermined pressure;

(h) comparing the pressure difference determined in said step (g) with a second predetermined pressure difference; and (i) if the pressure difference determined in said step (g) is greater than said second predetermined pressure difference, determining a new valve position based upon a second predetermined valve position; or (j) if the pressure difference determined in said step (g) is less than said second predetermined pressure difference and the pressure sensed in said step (f) is greater than said second predetermined pressure, determining a new valve position based upon the difference determined in said step (g);

(k) comparing the new valve position determined in said step (d) or (e) with the new valve position determined in said step (i) or (j) to determine the most closed valve position; and (l) moving the valve to the most closed valve position determined in said step (k).

21. A method as defined in claim 20 wherein said first predetermined valve position is different from said second predetermined valve position.

22. A method as defined in claim 20 wherein said first predetermined pressure difference is the same as said second predetermined pressure difference.

23. A method as defined in claim 22 wherein said second predetermined pressure difference is approximately five psi.

24. A method of controlling a valve comprising the steps of:

(a) sensing the pressure within a conduit;

(b) determining the difference between the pressure sensed in said step (a) and a predetermined pressure;

(c) comparing the pressure difference determined in said step (b) with a predetermined pressure difference of approximately five psi; and (d) if the pressure difference determined in said step (b) is greater than said five psi pressure difference, moving a valve coupled to the conduit from an initial position to a predetermined position; or (e) if the pressure difference computed in said step (b) is less than said five psi pressure difference and the pressure sensed in said step (a) is beyond said predetermined pressure, moving the valve from an initial position to a new position based upon the pressure difference determined in said step (b).

25. A pipeline pressure control system that responds to a pressure surge in a pipeline by changing the pipeline pressure in the direction opposite the pressure surge, said pressure control system having a predetermined shutdown pressure, said pressure control system comprising:
   a pipeline;
   a valve coupled to said pipeline for varying the flow of fluid through said pipeline;
   a pressure sensor coupled to said pipeline for sensing the pressure of the fluid within said pipeline; and
   a controller coupled to said pressure sensor and said valve for controlling said valve, said controller causing said valve to be moved from an initial position to a predetermined position in response to said pressure sensor sensing a pressure that varies from a predetermined pressure setpoint by at least a predetermined amount, whereby the pipeline pressure is changed in the direction opposite the pressure surge, said predetermined amount being substantially less than the difference between said predetermined pressure setpoint an said predetermined shutdown pressure.

26. A pressure control system having a predetermined shutdown pressure, comprising:
   a conduit;
   a valve coupled to said conduit that varies the flow of fluid through said conduit, said valve having a first position corresponding to a predetermined pressure setpoint and a second position corresponding to a predetermined position different than said first position;
   a pressure sensor coupled to said conduit that senses the pressure of the fluid within said conduit; and
   a controller coupled to said pressure sensor and said valve that controls said valve, said controller causing said valve to be moved in said second position in response to said pressure sensor sensing a pressure that varies from a predetermined pressure by at least a predetermined amount, said predetermined amount being substantially less than the difference between said predetermined pressure setpoint and said predetermined shutdown pressure.

27. A pressure control system comprising:
   a conduit;
   a valve coupled to said conduit that varies the flow of fluid through said conduit, said valve having a first position corresponding to a predetermined pressure setpoint and a second position corresponding to a predetermined position different than said first position;
   a pressure sensor coupled to said conduit that senses the pressure of the fluid within said conduit; and
   a controller coupled to said pressure sensor and said valve that controls said valve, said controller causing said valve to be moved to said second position in response to said pressure sensor sensing a pressure that varies from a predetermined pressure by at least a predetermined amount.

28. A method of controlling a valve comprising the steps of:
   (a) sensing the pressure within a conduit;
   (b) determining the difference between the pressure sensed in said step (a) and a predetermined target pressure;
   (c) comparing the pressure difference determined in said step (b) with a predetermined pressure difference; and
   (d) moving a valve to a predetermined position if the pressure difference determined in said step (b) is greater than said predetermined pressure difference, said predetermined position being a position different than the position of the valve corresponding to said predetermined target pressure.

* * * * *

UNITED STATES PATENT AND TRADEMARK OFFICE
CERTIFICATE OF CORRECTION

PATENT NO. : 4,934,399

DATED : June 19, 1990

INVENTOR(S) : Chun H. Cho

It is certified that error appears in the above-identified patent and that said Letters Patent is hereby corrected as shown below:

On the title page, under "Assignee:", "Clayton, Mich." should be --Clayton, Mo.--.

Signed and Sealed this

Seventeenth Day of December, 1991

*Attest:*

HARRY F. MANBECK, JR.

*Attesting Officer*　　　　*Commissioner of Patents and Trademarks*